US012505794B2

(12) United States Patent
Yang

(10) Patent No.: US 12,505,794 B2
(45) Date of Patent: Dec. 23, 2025

(54) PIXEL AND DISPLAY DEVICE

(71) Applicant: Samsung Display Co., Ltd., Yongin-si (KR)

(72) Inventor: Gunwoo Yang, Seoul (KR)

(73) Assignee: Samsung Display Co., Ltd., Suwon-si (KR)

( * ) Notice: Subject to any disclaimer, the term of this patent is extended or adjusted under 35 U.S.C. 154(b) by 0 days.

(21) Appl. No.: 17/981,804

(22) Filed: Nov. 7, 2022

(65) Prior Publication Data

US 2023/0267882 A1 Aug. 24, 2023

(30) Foreign Application Priority Data

Feb. 24, 2022 (KR) ........................ 10-2022-0024014

(51) Int. Cl.
*G09G 3/3233* (2016.01)
*G09G 3/00* (2006.01)

(52) U.S. Cl.
CPC ........... *G09G 3/3233* (2013.01); *G09G 3/006* (2013.01); *G09G 2300/0426* (2013.01); *G09G 2300/0452* (2013.01); *G09G 2300/0819* (2013.01); *G09G 2300/0852* (2013.01); *G09G 2300/0861* (2013.01); *G09G 2320/043* (2013.01); *G09G 2330/12* (2013.01)

(58) Field of Classification Search
None
See application file for complete search history.

(56) References Cited

U.S. PATENT DOCUMENTS

| | | | | |
|---|---|---|---|---|
| 7,825,880 B2 * | 11/2010 | Yumoto | G09G 3/3233 345/80 |
| 8,901,936 B2 | 12/2014 | Jin et al. | |
| 9,454,932 B2 | 9/2016 | Ono et al. | |
| 11,282,421 B2 | 3/2022 | Yang et al. | |
| 2015/0054722 A1 * | 2/2015 | Kanda | G09G 3/3233 345/77 |

FOREIGN PATENT DOCUMENTS

| | | |
|---|---|---|
| JP | 5756865 | 7/2015 |
| KR | 10-2013-0104563 | 9/2013 |

* cited by examiner

*Primary Examiner* — Andre L Matthews
(74) *Attorney, Agent, or Firm* — Sughrue Mion, PLLC

(57) ABSTRACT

A pixel includes a first capacitor electrically connected between a first node and a second node, a second capacitor electrically connected between a first driving voltage line providing a first driving voltage and the first node, a light emitting diode including a first electrode and a second electrode electrically connected with a second driving voltage line providing a second driving voltage, first to fourth transistors, each including a first electrode, a second electrode, and a gate.

20 Claims, 12 Drawing Sheets

PIXEL AND DISPLAY DEVICE

CROSS-REFERENCE TO RELATED APPLICATIONS

This application claims priority to and benefit of Korean Patent Application No. 10-2022-0024014 under 35 U.S.C. § 119, filed on Feb. 24, 2022, in the Korean Intellectual Property Office (KIPO), the contents of which are incorporated by reference herein in their entireties.

BACKGROUND

1. Technical Field

Embodiments of the disclosure described herein relate to a pixel and a display device capable of improving reliability.

2. Description of the Related Art

A display device is included in the following that provides an image to a user: a smartphone, a digital camera, a notebook computer, a navigation system, a monitor, or a smart television. The display device generates an image and provides the user with the generated image through a display screen.

The display device includes multiple pixels and multiple driving circuits for controlling the pixels. Each of the pixels includes a light emitting device and a pixel circuit for controlling the light emitting device. The driving circuit of the pixel may include multiple transistors organically connected with each other.

The display device may display a given image by applying a data signal to a display layer and providing a current corresponding to the data signal to the light emitting device.

SUMMARY

Embodiments of the disclosure provide a pixel and a display device capable of improving reliability.

According to an embodiment, a pixel may include a first capacitor electrically connected between a first node and a second node, a second capacitor electrically connected between a first driving voltage line providing a first driving voltage and the first node, a light emitting diode that includes a first electrode and a second electrode, the second electrode electrically connected with a second driving voltage line providing a second driving voltage, a first transistor including a first electrode electrically connected with the first driving voltage line, a second electrode electrically connected with the first electrode of the light emitting diode, and a gate electrically connected with the second node, a second transistor including a first electrode electrically connected with a data line, a second electrode electrically connected with the first node, and a gate receiving a scan signal, a third transistor including a first electrode electrically connected with the first node, a second electrode electrically connected with a reference voltage line, and a gate receiving a compensation scan signal, and a fourth transistor including a first electrode electrically connected with the first electrode of the first transistor, a second electrode electrically connected with the first node, and a gate receiving an initialization scan signal.

The pixel may further include a fifth transistor including a first electrode electrically connected with the second electrode of the first transistor, a second electrode electrically connected with the second node, and a gate receiving the compensation scan signal, and a sixth transistor including a first electrode electrically connected with the second node, a second electrode electrically connected with a first initialization voltage line, and a gate receiving the initialization scan signal.

The pixel may further include a seventh transistor including a first electrode electrically connected with the first driving voltage line, a second electrode electrically connected with the first electrode of the first transistor, and a gate receiving a first emission signal, and an eighth transistor including a first electrode electrically connected with the first electrode of the light emitting diode, a second electrode electrically connected with the second electrode of the first transistor, and a gate receiving a second emission signal.

The pixel may further include a ninth transistor including a first electrode electrically connected with the first electrode of the first transistor, a second electrode electrically connected with a bias voltage line providing a bias voltage, and a gate receiving an initialization signal, and a tenth transistor including a first electrode electrically connected with a second initialization voltage line, a second electrode electrically connected with the first electrode of the light emitting diode, and a gate receiving the initialization signal.

During a first period, the initialization scan signal may be at an active level.

During a second period continuous to the first period, the scan signal, the initialization scan signal, and the compensation scan signal may be at the active level, and a test voltage may be applied to the data line.

During the second period, a level of the test voltage may be identical to a level of a reference voltage provided to the reference voltage line, and the data line and the first initialization voltage line may be electrically connected.

A saturation current may be provided to the data line in the second period.

During a third period continuous to the second period, the compensation scan signal may be at the active level.

According to an embodiment, a display device may include a display layer including a plurality of pixels, and operating in a test mode or a driving mode different from the test mode. Each of the plurality of pixels may include a first capacitor electrically connected between a first node and a second node, a second capacitor electrically connected between a first driving voltage line providing a first driving voltage and the first node, a light emitting diode that includes a first electrode and a second electrode, the second electrode electrically connected with a second driving voltage line providing a second driving voltage, a first transistor including a first electrode electrically connected with the first driving voltage line, a second electrode electrically connected with the first electrode of the light emitting diode, and a gate electrically connected with the second node, a second transistor including a first electrode electrically connected with a data line, a second electrode electrically connected with the first node, and a gate receiving a scan signal, a third transistor including a first electrode electrically connected with the first node, a second electrode electrically connected with a reference voltage line, and a gate receiving a compensation scan signal, and a fourth transistor including a first electrode electrically connected with the first electrode of the first transistor, a second electrode electrically connected with the first node, and a gate receiving an initialization scan signal.

Each of the plurality of pixels may further include a fifth transistor including a first electrode electrically connected with the second electrode of the first transistor, a second electrode electrically connected with the second node, and a gate receiving the compensation scan signal, a sixth transistor including a first electrode electrically connected with the second node, a second electrode electrically connected with a first initialization voltage line, and a gate receiving the initialization scan signal, a seventh transistor including a first electrode electrically connected with the first driving voltage line, a second electrode electrically connected with the first electrode of the first transistor, and a gate receiving a first emission signal, an eighth transistor including a first electrode electrically connected with the first electrode of the light emitting diode, a second electrode electrically connected with the second electrode of the first transistor, and a gate receiving a second emission signal, a ninth transistor including a first electrode electrically connected with the first electrode of the first transistor, a second electrode electrically connected with a bias voltage line providing a bias voltage, and a gate receiving an initialization signal, and a tenth transistor including a first electrode electrically connected with a second initialization voltage line, a second electrode electrically connected with the first electrode of the light emitting diode, and a gate receiving the initialization signal.

The test mode may include a first test period, a second test period, and a third test period, and during the first test period, the initialization scan signal may be at an active level.

During the second test period, the scan signal, the initialization scan signal, and the compensation scan signal may be at the active level, and a test voltage may be applied to the data line.

During the second test period, a level of the test voltage may be identical to a level of a reference voltage provided to the reference voltage line, and the data line and the first initialization voltage line may be electrically connected.

A saturation current may be provided to the data line in the second test period.

During the third test period, the compensation scan signal may be at the active level.

The driving mode may include a first driving period to a fifth driving period. During the first driving period, the first emission signal and the initialization scan signal may be at the active level. During the second driving period, the first emission signal and the compensation scan signal may be at the active level. During the second driving period, the first node may be electrically isolated from the first driving voltage line.

During the third driving period, the scan signal may be at the active level.

During the fourth driving period, the initialization signal may be at the active level.

During the fifth driving period, the first emission signal and the second emission signal may be at the active level.

BRIEF DESCRIPTION OF THE DRAWINGS

The above and other objects and features of the disclosure will become apparent by describing in detail embodiments thereof with reference to the accompanying drawings.

DETAILED DESCRIPTION OF THE EMBODIMENTS

Figure 1:
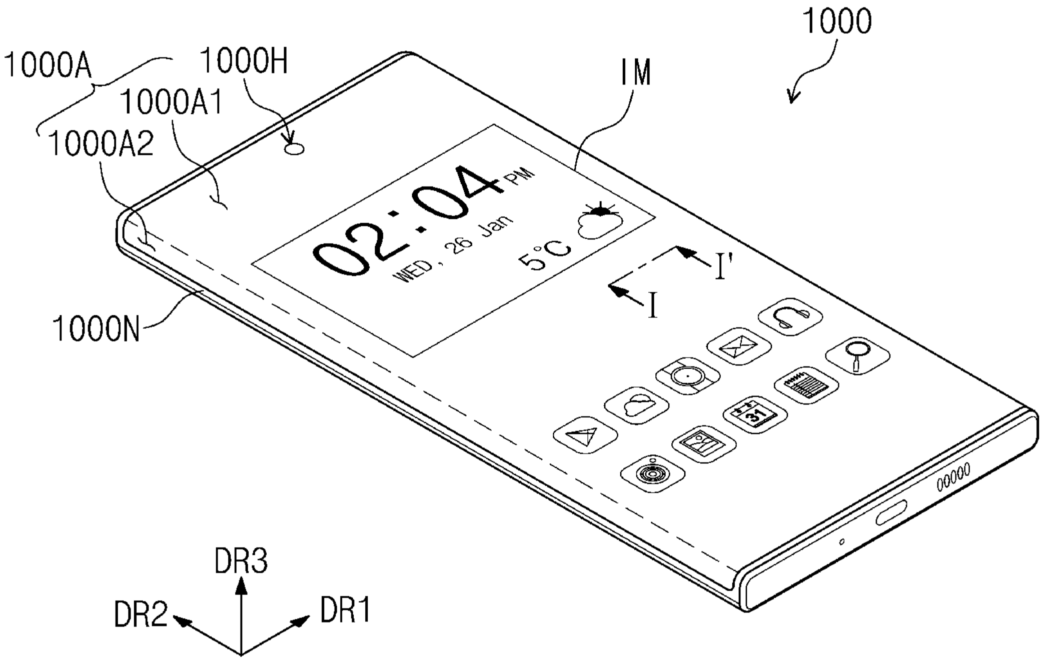
FIG. 1 is a perspective view of a display device according to an embodiment of the disclosure.

In the specification, the expression that a first component (or area, layer, part, portion, etc.) is "on", "connected with", or "coupled to" a second component means that the first component is directly on, connected with, or coupled to the second component or means that a third component is disposed therebetween. Likewise, when an element is referred to as being "connected" to another element, the element may be "directly connected" to another element, or "electrically connected" to another element with one or more intervening elements interposed therebetween. Additionally, if two elements are electrically connected (to each other), the two elements may be integral with each other, directly connected to each other, or electrically connected through another element.

Like reference numerals refer to like components. In drawings, thicknesses, proportions, and dimensions of components may be exaggerated to describe the technical features effectively. In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

Although the terms "first", "second", etc. may be used to describe various components, the components should not be construed as being limited by the terms. The terms are only used to distinguish one component from another component. For example, without departing from the scope and spirit of the disclosure, a first component may be referred to as a "second component", and similarly, the second component may be referred to as the "first component". The singular forms are intended to include the plural forms unless the context clearly indicates otherwise.

Spatially relative terms, such as "beneath", "below", "under", "lower", "above", "upper", "over", "higher", "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below", for example, can encompass both an orientation of above and below. Furthermore, the apparatus may be otherwise oriented (e.g., rotated 90 degrees or at other orientations), and, as such, the spatially relative descriptors used herein interpreted accordingly.

It will be further understood that the terms "comprises", "includes", "have", etc. specify the presence of stated features, numbers, steps, operations, elements, components, or a combination thereof but do not preclude the presence or addition of one or more other features, numbers, steps, operations, elements, components, or a combination thereof. In the specification and the claims, the phrase "at least one of" is intended to include the meaning of "at least one selected from the group of" for the purpose of its meaning and interpretation. For example, "at least one of A and B" may be understood to mean "A, B, or A and B."

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the disclosure will be described with reference to accompanying drawings.

FIG. 1 is a perspective view of a display device according to an embodiment of the disclosure.

Referring to FIG. 1, a display device 1000 may include large-sized electronic devices such as a television, a monitor, and an outer billboard. In another embodiment, the display device 1000 may include small and medium-sized electronic devices such as a personal computer, a notebook computer, a personal digital terminal, an automotive navigation system, a game console, a smartphone, a tablet, and a camera. However, the disclosure is not limited thereto. For example, the electronic device 1000 may include any other display devices that do not depart from the scope and spirit of the disclosure. An embodiment in which the display device 1000 employs is a smartphone in FIG. 1.

An active area 1000A and a surrounding area 1000N may be defined in the display device 1000. The active area 1000A may display an image IM. A first display surface 1000A1 and a second display surface 1000A2 may be defined in the active area 1000A. The first display surface 1000A1 may be parallel to a plane defined by a first direction DR1 and a second direction DR2 intersecting the first direction DR1, and the second display surface 1000A2 may extend from the first display surface 1000A1.

The second display surface 1000A2 may be bent and provided from a side of the first display surface 1000A1. The second display surface 1000A2 may include multiple second display surfaces 1000A2. The second display surfaces 1000A2 may be bent and provided from at least two sides of the first display surface 1000A1. One first display surface 1000A1 and 1 or more and 4 or less second display surfaces 1000A2 may be defined in the active area 1000A. However, the shape of the active area 1000A is not limited thereto. For example, only one first display surface 1000A1 may be defined in the active area 1000A.

The surrounding area 1000N may be disposed adjacent to the active area 1000A. The surrounding area 1000N may be referred to as a "bezel area".

A hole area 1000H may be surrounded by the active area 1000A. The hole area 1000H may refer to an area through which a light signal is transmitted and received. For example, the hole area 1000H may refer to an area where an electronic part is disposed.

A thickness direction of the display device 1000 may be perpendicular to a third direction DR3 intersecting the first direction DR1 and the second direction DR2. Accordingly, front surfaces (or upper surfaces) and rear surfaces (or lower surfaces) of members constituting the display device 1000 may be defined with respect to the third direction DR3.

Figure 2A:
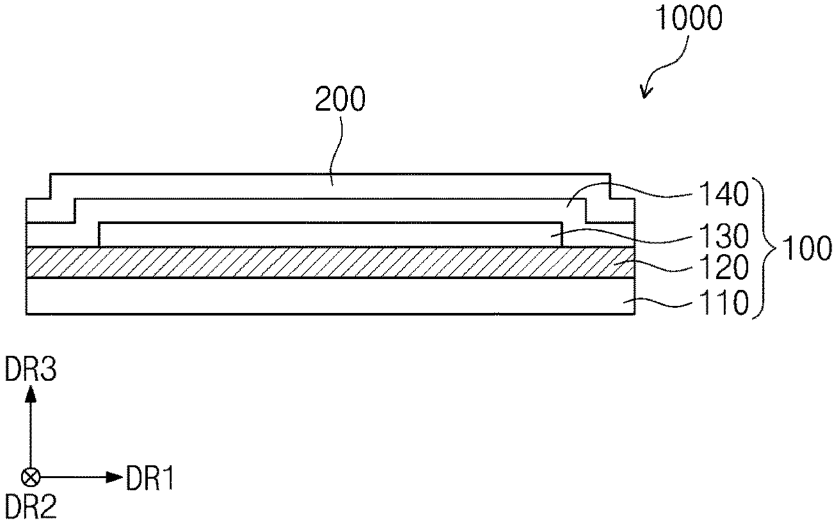
FIG. 2A is a schematic cross-sectional view of a display device according to an embodiment of the disclosure.

FIG. 2A is a schematic cross-sectional view of a display device according to an embodiment of the disclosure.

Referring to FIG. 2A, the display device 1000 may include a display layer 100 and a sensor layer 200.

The display layer 100 may be a component that substantially generates the image IM (refer to FIG. 1). The display layer 100 may be an emission-type display layer. For example, the display layer 100 may be an organic light emitting display layer, a quantum dot display layer, a micro-LED display layer, or a nano-LED display layer. The display layer 100 may include a base layer 110, a circuit layer 120, a light emitting device layer 130, and an encapsulation layer 140.

The base layer 110 may be a member that provides a base surface on which the circuit layer 120 is disposed. The base layer 110 may be a glass substrate, a metal substrate, or a polymer substrate. However, an embodiment is not limited thereto. For example, the base layer 110 may be an inorganic layer, an organic layer, or a composite material layer.

The base layer 110 may have a multi-layer structure. For example, the base layer 110 may include a first synthetic resin layer, a silicon oxide ($SiO_x$) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be collectively referred to as a "base barrier layer".

Each of the first and second synthetic resin layers may include a polyimide-based resin. Also, each of the first and second synthetic resin layers may include at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. The expression "X-based resin" in the specification may indicate that resin including a functional group of X.

The circuit layer 120 may be disposed on the base layer 110. The circuit layer 120 may include an insulating layer, a semiconductor pattern, a conductive pattern, a signal line, and the like. An insulating layer, a semiconductor layer, and a conductive layer may be formed on the base layer 110 through a coating or deposition process, and the insulating layer, the semiconductor layer, and the conductive layer may be selectively patterned through multiple photolithography processes. After these processes, the semiconductor pattern, the conductive pattern, and the signal line included in the circuit layer 120 may be formed.

The light emitting device layer 130 may be disposed on the circuit layer 120. The light emitting device layer 130 may include a light emitting device. For example, the light emitting device layer 130 may include an organic light-emitting material, a quantum dot, a quantum rod, a micro LED, or a nano LED.

The encapsulation layer 140 may be disposed on the light emitting device layer 130. The encapsulation layer 140 may protect the light emitting device layer 130 from foreign substances such as moisture, oxygen, and/or dust particles.

The sensor layer 200 may be disposed on the display layer 100. The sensor layer 200 may sense an external input applied from the outside.

The sensor layer 200 may be formed on the display layer 100 through a successive process. The sensor layer 200 may be directly disposed on the display layer 100. Herein, the expression "directly disposed" may mean that a third component is not interposed between the sensor layer 200 and the display layer 100. For example, a separate adhesive member may not be interposed between the sensor layer 200 and the display layer 100. In another embodiment, the sensor layer 200 may be coupled to the display layer 100 through an adhesive member. The adhesive member may include a typical adhesive or sticking agent.

Figure 2B:
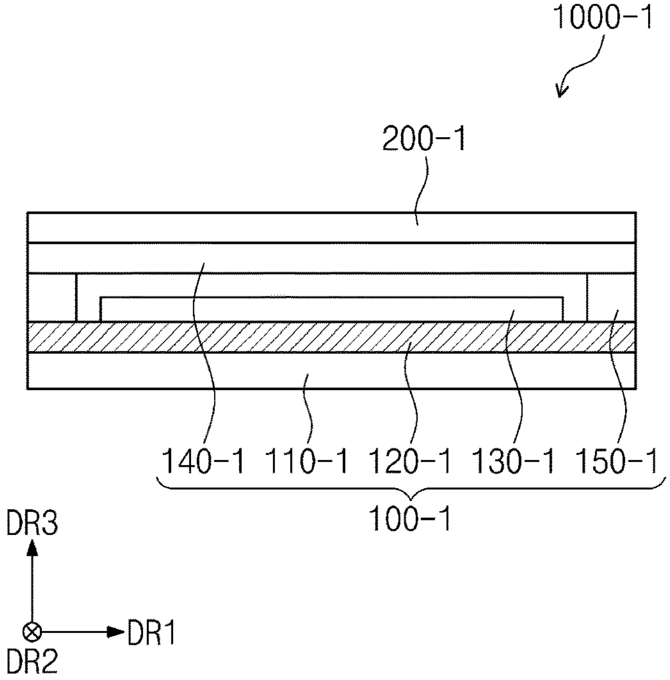
FIG. 2B is a schematic cross-sectional view of a display device according to an embodiment of the disclosure.

FIG. 2B is a schematic cross-sectional view of a display device according to an embodiment of the disclosure.

Referring to FIG. 2B, a display device 1000-1 may include a display layer 100-1 and a sensor layer 200-1.

The display layer 100-1 may include a base substrate 110-1, a circuit layer 120-1, a light emitting device layer 130-1, an encapsulation substrate 140-1, and a coupling member 150-1.

Each of the base substrate 110-1 and the encapsulation substrate 140-1 may be a glass substrate, a metal substrate, or a polymer substrate, but is not specifically limited thereto.

The coupling member 150-1 may be interposed between the base substrate 110-1 and the encapsulation substrate 140-1. The coupling member 150-1 may couple the encapsulation substrate 140-1 to the base substrate 140-1 or the circuit layer 120-1. The coupling member 150-1 may include an inorganic material or an organic material. For example, the inorganic material may include a frit seal, and the organic material may include a photo-curable material or a photo-plastic resin. However, a material constituting the coupling member 150-1 is not limited to the above example.

The sensor layer 200-1 may be directly disposed on the encapsulation substrate 140-1. Herein, the expression “directly disposed” may mean that a third component is not interposed between the sensor layer 200-1 and the encapsulation substrate 140-1. For example, a separate adhesive member may not be interposed between the sensor layer 200-1 and the encapsulation substrate 140-1. However, the disclosure is not limited thereto. For example, an adhesive layer may be interposed between the sensor layer 200-1 and the encapsulation substrate 140-1.

Figure 3:
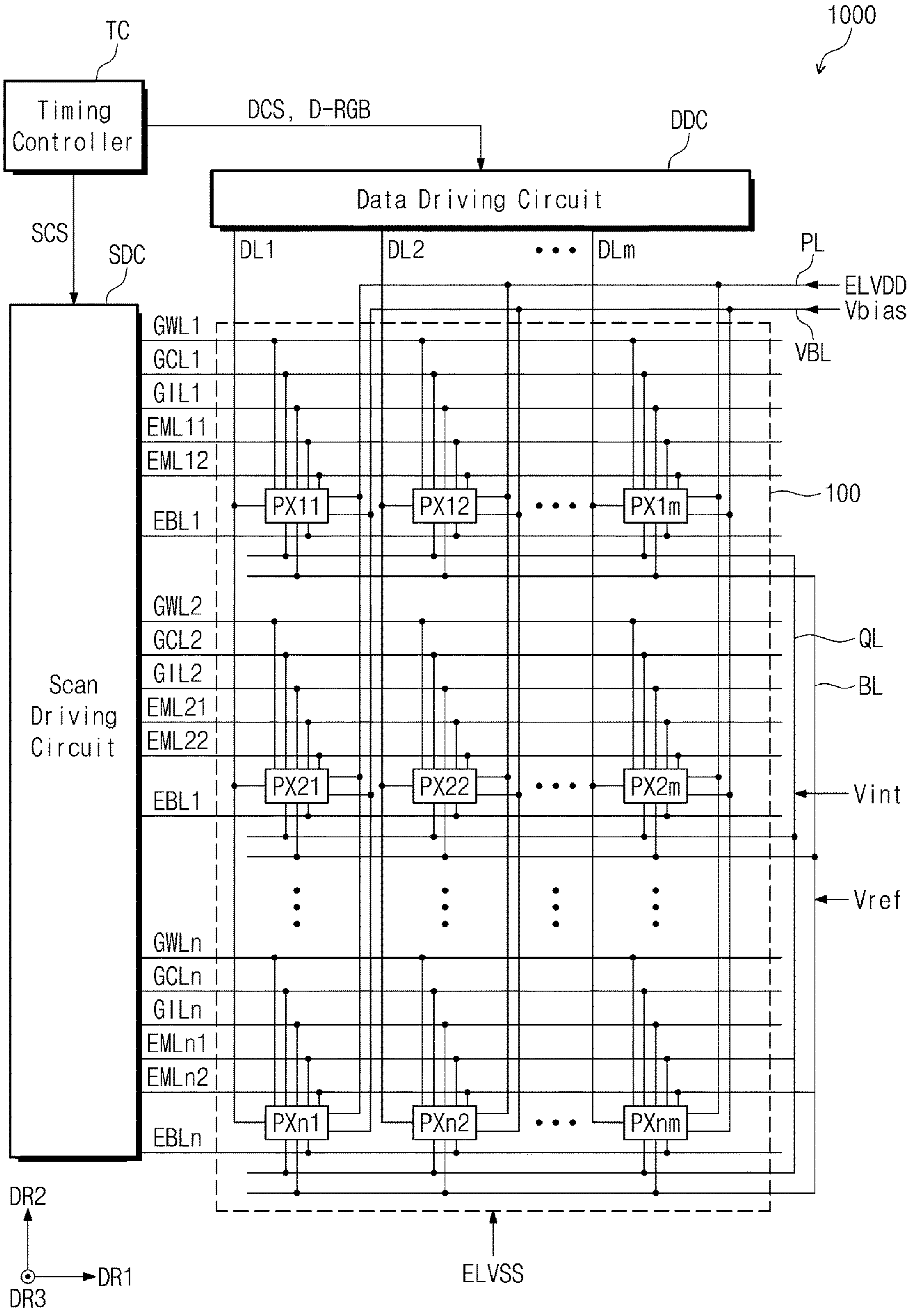
FIG. 3 is a schematic block diagram of a display device according to an embodiment of the disclosure.

FIG. 3 is a schematic block diagram of a display device according to an embodiment of the disclosure.

Referring to FIG. 3, the display device 1000 may include a timing controller TC, a scan driving circuit SDC, a data driving circuit DDC, and the display layer 100.

The timing controller TC may receive image signals and a control signal from the outside. The timing controller TC may generate image data D-RGB by converting a data format of image signals in compliance with the specification for an interface with the data driving circuit DDC. The timing controller TC may convert the control signal to generate a scan control signal SCS and a data control signal DCS. The timing controller TC may output the image data D-RGB, the data control signal DCS, and the scan control signal SCS.

The scan driving circuit SDC may receive the scan control signal SCS from the timing controller TC. The scan control signal SCS may include a vertical start signal allowing an operation of the scan driving circuit SDC to start, a clock signal determining the timing to output signals, etc. The scan driving circuit SDC may generate multiple scan signals, multiple compensation scan signals, and multiple initialization scan signals. The scan driving circuit SDC may output the scan signals to corresponding data write lines GWL1 to GWLn, may output the compensation scan signals to corresponding compensation scan lines GCL1 to GCLn, and may output the initialization scan signals to corresponding initialization scan lines GIL1 to GILn. Also, the scan driving circuit SDC may generate multiple emission signals and multiple initialization signals in response to the scan control signal SCS. The scan driving circuit SDC may output the emission signals to corresponding emission signal lines EML1 to EMLn and may output the initialization signals to corresponding initialization signal lines EBL1 to EBLn.

An example in which the scan signals, the compensation scan signals, the initialization scan signals, the emission signals, and the initialization signals are output from one scan driving circuit SDC is illustrated in FIG. 3, but the disclosure is not limited thereto. In an embodiment of the disclosure, the display device 1000 may include multiple scan driving circuits SDC. Each of the scan driving circuits SDC may output the scan signals, the compensation scan signals, the initialization scan signals, the emission signals, and the initialization signals. In another embodiment of the disclosure, the scan driving circuit SDC may include a driving circuit that generates and outputs the scan signals, the compensation scan signals, and the initialization scan signals, and a driving circuit that generates and outputs the emission signals and the initialization signals.

The data driving circuit DDC may receive the data control signal DCS and the image data D-RGB from the timing controller TC. The data driving circuit DDC may convert the image data D-RGB into data voltages to output the data voltages to multiple data lines DL1 to DLm to be described later. The data voltages may be analog voltages that respectively correspond to gray scale values of the image data D-RGB.

The display layer 100 may include the data write lines GWL1 to GWLn, the compensation scan lines GCL1 to GCLn, the initialization scan lines GIL1 to GILn, the emission signal lines EML1 to EMLn, the initialization signal lines EBL1 to EBLn, the data lines DL1 to DLm, a driving voltage line PL, an initialization voltage line QL, a bias voltage line VBL, a common voltage line RL (not shown), multiple pixels PX11 to PXnm. The data write lines GWL1 to GWLn, the compensation scan lines GCL1 to GCLn, the initialization scan lines GIL1 to GILn, the emission signal lines EML1 to EMLn, the initialization signal lines EBL1 to EBLn, and the initialization signal lines EBL1 to EBLn may extend in the first direction DR1 and may be arranged in the second direction DR2 intersecting the first direction DR1.

The data lines DL1 to DLm may intersect the data write lines GWL1 to GWLn, the compensation scan lines GCL1 to GCLn, the initialization scan lines GIL1 to GILn, the emission signal lines EML1 to EMLn, the initialization signal lines EBL1 to EBLn, and the initialization signal lines EBL1 to EBLn and may be insulated therefrom. The pixels PX11 to PXnm may be electrically connected with the lines GWL1 to GWLn, GCL1 to GCLn, and GIL1 to GILn. The connection relationship between the pixels PX11 to PXnm and the signal lines GWL1 to GWLn, GCL1 to GCLn, and GIL1 to GILn may be changed depending on a configuration of driving circuits of the pixels PX11 to PXnm.

The driving voltage line PL may receive a first driving voltage ELVDD. The first driving voltage ELVDD may be referred to as a “power supply voltage”. The initialization voltage line QL may receive an initialization voltage Vint. The bias voltage line VBL may receive a bias voltage Vbias. A reference voltage line BL may receive a reference voltage Vref. In another embodiment, the reference voltage line BL may receive the first driving voltage ELVDD. A level of the initialization voltage Vint may be lower than a level of the first driving voltage ELVDD. A second driving voltage ELVSS may be applied to a display panel. The second driving voltage ELVSS may be referred to as a “common voltage". A level of the second driving voltage ELVSS may be lower than the level of the first driving voltage ELVDD.

The display device 1000 is described in FIG. 3, but the display device 1000 according to an embodiment of the disclosure is not limited thereto. Depending on a configuration of a pixel, the signal lines GWL1 to GWLn, GCL1 to GCLn, and GIL1 to GILn may be further included in the display device 1000 or may be omitted. Also, the connection relationship between the pixels PX11 to PXnm and the signal lines GWL1 to GWLn, GCL1 to GCLn, and GIL1 to GILn may be changed.

The pixels PX11 to PXnm may include multiple groups including light emitting diodes OLED (refer to FIG. 4) generating different color lights. For example, the pixels PX11 to PXnm may include red pixels generating a red color light, green pixels generating a green color light, and blue pixels generating a blue color light. A light emitting diode of a red pixel, a light emitting diode of a green pixel, and a light emitting diode of a blue pixel may include emission layers of different materials.

Each of the pixels PX11 to PXnm may include multiple transistors and at least one capacitor electrically connected with the transistors. This will be described later.

At least one of the scan driving circuit SDC and the data driving circuit DDC may include multiple transistors formed through the same process as a pixel driving circuit.

The signal lines GWL1 to GWLn, GCL1 to GCLn, and GIL1 to GILn, the pixels PX11 to PXnm, the scan driving circuit SDC, and the data driving circuit DDC may be formed on a base substrate through multiple photolithography processes.

Figure 4:
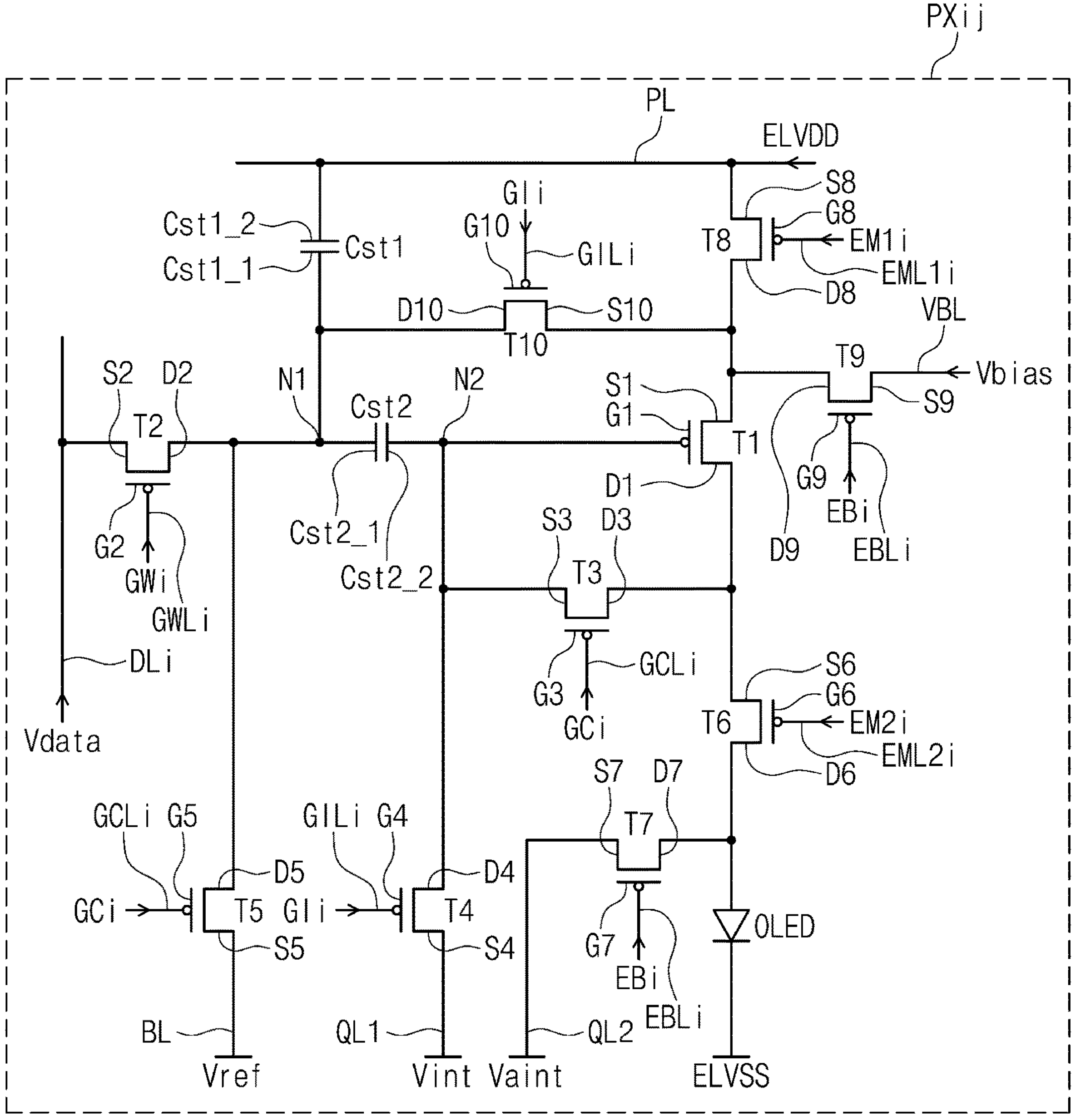
FIG. 4 is a schematic diagram of an equivalent circuit of a pixel according to an embodiment of the disclosure.

FIG. 4 is a schematic diagram of an equivalent circuit of a pixel according to an embodiment of the disclosure.

Referring to FIG. 4, a pixel PXij that is electrically connected with an i-th data write line GWLi among the data write lines GWL1 to GWLn and is electrically connected with an j-th data line DLj among the data lines DL1 to DLm is illustrated as an example.

In this embodiment, the pixel PXij may include first to tenth transistors T1 to T10, a first capacitor Cst1, a second capacitor Cst2, and the light emitting diode OLED. In this embodiment, the description will be given as each of the first to tenth transistors T1 to T10 is a P-type transistor. However, the disclosure is not limited thereto. For example, each of the first to tenth transistors T1 to T10 may be one of a P-type transistor and an N-type transistor. Also, the number of transistors included in the pixel PXij is not limited to the above example. For example, at least one of the first to tenth transistors T1 to T10 may be omitted. In another embodiment, the pixel PXij may further include one or more transistors.

In this embodiment, in each of the first to tenth transistors T1 to T10, a source may be referred to as a "first electrode", and a drain may be referred to as a "second electrode".

In this embodiment, the first transistor T1 may be referred to as a "driving transistor", and the second transistor T2 may be referred to as a "switching transistor".

The first capacitor Cst1 may be electrically connected between the driving voltage line PL receiving the first driving voltage ELVDD and a first node N1. The first capacitor Cst1 may include a first electrode Cst1_1 electrically connected with the first node N1 and a second electrode Cst1_2 electrically connected with the driving voltage line PL.

The second capacitor Cst2 may be electrically connected between the first node N1 and a second node N2. The second capacitor Cst2 may include a first electrode Cst2_1 electrically connected with the first node N1 and a second electrode Cst2_2 electrically connected with the second node N2.

The first transistor T1 may be electrically connected between the driving voltage line PL and an electrode of the light emitting diode OLED. The electrode may be an anode of the light emitting diode OLED. The anode may be referred to as a "first electrode". A source S1 of the first transistor T1 may be electrically connected with the driving voltage line PL. Any other transistor may be disposed between the source S1 of the first transistor T1 and the driving voltage line PL, or any other transistor therebetween may be omitted.

A drain D1 of the first transistor T1 may be electrically connected with the anode of the light emitting diode OLED. A gate G1 of the first transistor T1 may be electrically connected with the second node N2.

The second transistor T2 may be electrically connected between the j-th data line DLj and the first node N1. A source S2 of the second transistor T2 may be electrically connected with the j-th data line DLj, and a drain D2 of the second transistor T2 may be electrically connected with the first node N1. A gate G2 of the second transistor T2 may be electrically connected with the i-th data write line GWLi. The gate G2 of the second transistor T2 may receive the scan signal GWi.

The third transistor T3 may be electrically connected between the drain D1 of the first transistor T1 and the second node N2. A source S3 of the third transistor T3 may be electrically connected with the second node N2, and a drain D3 of the third transistor T3 may be electrically connected with the drain D1 of the first transistor T1. A gate G3 of the third transistor T3 may be electrically connected with the i-th compensation scan line GCLi. The gate G3 of the third transistor T3 may receive the compensation scan signal GCi.

The initialization voltage line QL (refer to FIG. 3) may include a first initialization voltage line QL1 and a second initialization voltage line QL2.

The fourth transistor T4 may be electrically connected between the source S3 of the third transistor T3 and the first initialization voltage line QL1. A source S4 of the fourth transistor T4 may be electrically connected with the first initialization voltage line QL1. A first initialization voltage Vint may be provided to the source S4 of the fourth transistor T4. A drain D4 of the fourth transistor T4 may be electrically connected with the source S3 of the third transistor T3. A gate G4 of the fourth transistor T4 may be electrically connected with the i-th initialization scan line GILi. The gate G4 of the fourth transistor T4 may receive an initialization scan signal GIi.

However, this is only an example, and each of the third transistor T3 and the fourth transistor T4 according to an embodiment of the disclosure may include multiple transistors connected in series. As each of the third transistor T3 and the fourth transistor T4 includes multiple transistors, it may be possible to reduce a leakage current of the pixel PXij that may occur in case that the first transistor is turned off.

The fifth transistor T5 may be electrically connected between the first node N1 and the reference voltage line BL. A drain D5 of the fifth transistor T5 may be electrically connected with the first node N1, and a source S5 of the fifth transistor T5 may be electrically connected with the reference voltage line BL. A gate G5 of the fifth transistor T5 may be electrically connected with the i-th compensation scan line GCLi. The gate G5 of the fifth transistor T5 may receive the compensation scan signal GCi.

The sixth transistor T6 may be electrically connected between the drain D1 of the first transistor T1 and the light emitting diode OLED. A source S6 of the sixth transistor T6 may be electrically connected with the drain D1 of the first transistor T1, and a drain D6 of the sixth transistor T6 may be electrically connected with the anode of the light emitting diode OLED. In this embodiment, a gate G6 of the sixth transistor T6 may be electrically connected with a second emission signal line EML2*i*. A gate G6 of the sixth transistor T6 may receive a second emission signal EM2*i*.

The seventh transistor T7 may be electrically connected between the anode of the light emitting diode OLED and the second initialization voltage line QL2. A source S7 of the seventh transistor T7 may be electrically connected with the second initialization voltage line QL2. A second initialization voltage Vaint may be provided to the source S7 of the seventh transistor T7. A level of the second initialization voltage Vaint may be lower than a level of the first initialization voltage Vint. A drain D7 of the seventh transistor T7 may be electrically connected with the anode of the light emitting diode OLED. In this embodiment, a gate G7 of the seventh transistor T7 may be electrically connected with an i-th initialization signal line EBLi. The seventh transistor T7 may receive an i-th initialization signal EBi.

The eighth transistor T8 may be electrically connected between the driving voltage line PL and the source S1 of the first transistor T1. A source S8 of the eighth transistor T8 may be electrically connected with the driving voltage line PL, and a drain D8 of the eighth transistor T8 may be electrically connected with the source S1 of the first transistor T1. A gate G8 of the eighth transistor T8 may be electrically connected with a first emission signal line EMLli. A first emission signal EMli may be provided to the gate G8 of the eighth transistor T8.

The ninth transistor T9 may be electrically connected between the source S1 of the first transistor T1 and the bias voltage line VBL. A source S9 of the ninth transistor T9 may be electrically connected with the bias voltage line VBL. The bias voltage Vbias may be provided to the source S9 of the ninth transistor T9. A drain D9 of the ninth transistor T9 may be electrically connected with the source S1 of the first transistor T1. A gate G9 of the ninth transistor T9 may be electrically connected with an i-th initialization signal line EBLi. The ninth transistor T9 may receive the i-th initialization signal EBi.

The tenth transistor T10 may be electrically connected between the source S1 of the first transistor T1 and the first node N1. A source S10 of the tenth transistor T10 may be electrically connected with the source S1 of the first transistor T1. A drain D10 of the tenth transistor T10 may be electrically connected with the first node N1. A gate G10 of the tenth transistor T10 may be electrically connected with the i-th initialization scan line GILi. A gate G10 of the tenth transistor T10 may receive the initialization scan signal GIi.

Figure 5:
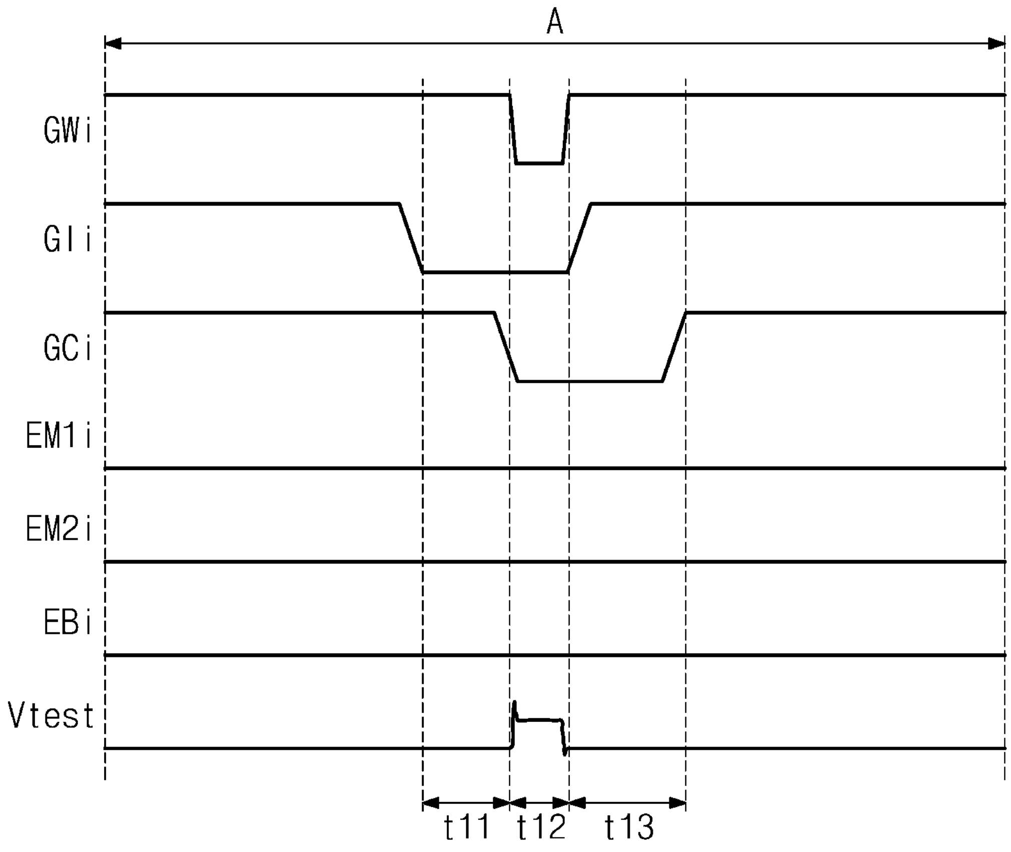
FIG. 5 is a schematic timing diagram of a test mode of a display device according to an embodiment of the disclosure.
Figure 6:
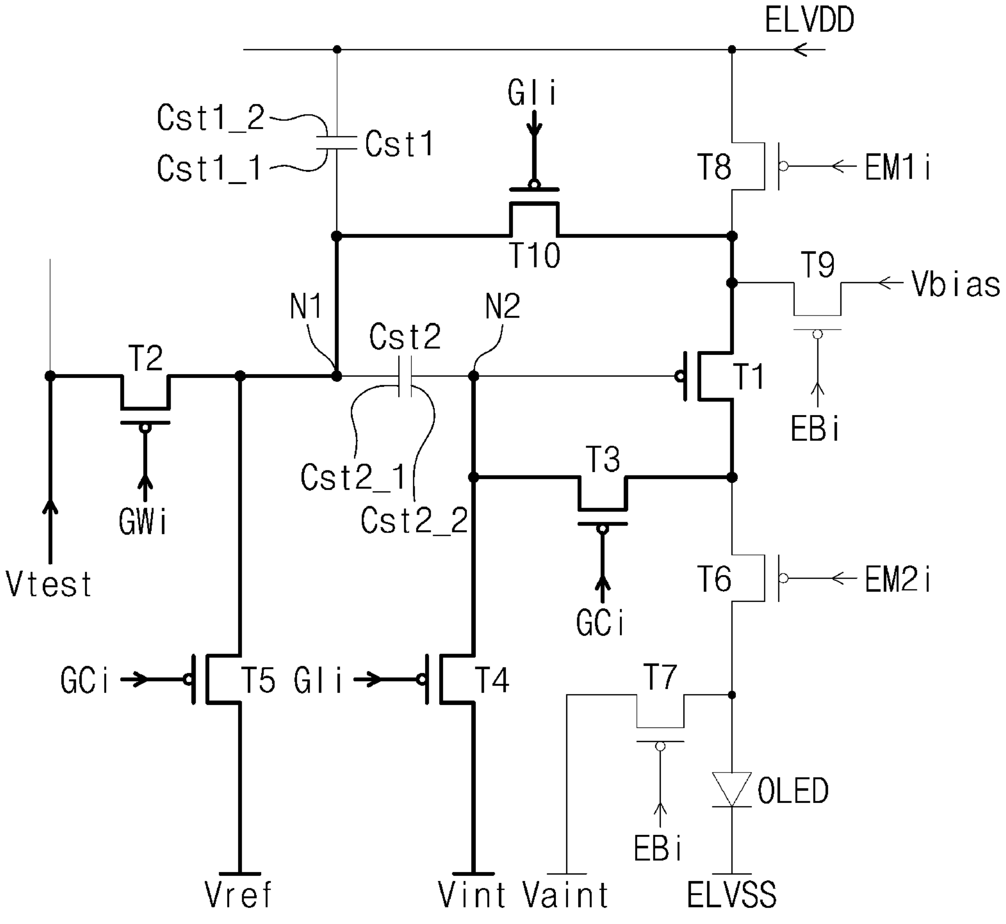
FIG. 6 is a schematic diagram for describing an operation of a pixel in a test mode according to an embodiment of the disclosure.

FIG. 5 is a schematic timing diagram of a test mode of a display device according to an embodiment of the disclosure, and FIG. 6 is a schematic diagram for describing an operation of a pixel in a test mode according to an embodiment of the disclosure. In the description of FIG. 6, the components that are described with reference to FIG. 4 are marked by the same reference numerals, and thus, additional description will be omitted to avoid redundancy.

Referring to FIGS. 4, 5, and 6, the display layer 100 may be tested after a manufacturing process is completed. In a test step, the display layer 100 may operate in a test mode "A".

The test mode "A" may include a first test period t11, a second test period t12, and a third test period t13.

In the first test period t11, the initialization scan signal GIi may be at an active level. The active level of the initialization scan signal GIi may be a low level.

In the first test period t11, the scan signal GWi, the compensation scan signal GCi, the first emission signal EMli, the second emission signal EM2*i*, and the initialization signal EBi may be at an inactive level. The inactive level of each of the scan signal GWi, the compensation scan signal GCi, the first emission signal EMli, the second emission signal EM2*i*, and the initialization signal EBi may be a high level.

The fourth transistor T4 may be turned on in response to the initialization scan signal GIi. The tenth transistor T10 may be turned on in response to the initialization scan signal GIi. The first initialization voltage Vint may be provided to the gate G1 of the first transistor T1 through the fourth transistor T4.

The second test period t12 may follow the first test period t11. The second test period t12 may be continuous to the first test period t11.

In the second test period t12, the scan signal GWi, the initialization scan signal GIi, and the compensation scan signal GCi may be at the active level. The active level of each of the scan signal GWi, the initialization scan signal GIi, and the compensation scan signal GCi may be the low level.

In the second test period t12, the first emission signal EMli and the second emission signal EM2*i* may be at the inactive level. The inactive level of each of the first emission signal EMli and the second emission signal EM2*i* may be the high level.

In the second test period t12, a test voltage Vtest may be applied to the data line DLi. The test voltage Vtest may be identical in level to the reference voltage Vref provided to the reference voltage line BL. A saturation current may be provided through the test voltage Vtest.

Unlike the disclosure, in testing the display layer 100 where a current smaller in level than the saturation current is provided to the data line DLi, a current decreased by the second capacitor Cst2 may flow to the first initialization voltage line QL1; and the current provided through the test voltage Vtest may be lessened. However, according to the disclosure, the influence of the second capacitor Cst2 may be ignored due to the saturation current. The user may readily confirm the connection state of the first transistor T1, the second transistor T2, the third transistor T3, the fourth transistor T4, the fifth transistor T5, the eighth transistor T8, the ninth transistor T9, and the tenth transistor T10. The display device 1000 (refer to FIG. 1) in which the reliability of the test mode "A" is improved may be provided. Accordingly, the display device 1000 (refer to FIG. 1) whose reliability is improved may be provided.

The second transistor T2 may be turned on in response to the scan signal GWi. The fourth transistor T4 and the tenth transistor T10 may be turned on in response to the initialization scan signal GIi. The third transistor T3 and the fifth transistor T5 may be turned on in response to the compensation scan signal GCi.

The test voltage Vtest may be provided to the first initialization voltage line QL1 through the second transistor T2, the tenth transistor T10, the first transistor T1, the third transistor T3, and the fourth transistor T4.

Unlike the disclosure, in the case where a pixel does not include the tenth transistor T10, even though the test voltage Vtest is provided through the data line DLi, only the second and fifth transistors T2 and T5 may be tested due to the first capacitor Cst1 and the second capacitor Cst2. For example, it is impossible to test a defect of the first transistor T1 being the driving transistor. However, according to the disclosure, a current path may be formed by the first transistor T1, the second transistor T2, the third transistor T3, the fourth transistor T4, the fifth transistor T5, and the tenth transistor T10. Test information may be measured from the first initialization voltage line QL1 based on the test voltage Vtest provided through the data line DLi. The user may test a state of the pixel PXij based on the test information. The pixel PXij and the display device 1000 (refer to FIG. 1) with an improved detectable coverage (or testable range) of transistors may be provided. Accordingly, the pixel PXij and display device 1000 (refer to FIG. 1) with an improved reliability may be provided.

For example, in case that a short circuit occurs in at least one of the first transistor T1, the second transistor T2, the third transistor T3, the fourth transistor T4, the fifth transistor T5, the eighth transistor T8, the ninth transistor T9, and the tenth transistor T10, even though the scan signal GWi, the initialization scan signal GIi, and the compensation scan signal GCi are inactive, the test voltage Vtest provided through the data line DLi may be transferred through the first initialization voltage line QL1 due to the short circuit. Accordingly, the pixel PXij according to an embodiment of the disclosure may readily detect a defect due to the short circuit.

For example, in case that an open circuit occurs in at least one of the first transistor T1, the second transistor T2, the third transistor T3, the fourth transistor T4, the fifth transistor T5, the eighth transistor T8, the ninth transistor T9, and the tenth transistor T10, even though the scan signal GWi, the initialization scan signal GIi, and the compensation scan signal GCi are active, the test voltage Vtest provided through the data line DLi may not be transferred through the first initialization voltage line QL1 due to the open circuit. Accordingly, the pixel PXij according to an embodiment of the disclosure may readily detect a defect due to the open circuit.

According to the disclosure, a defect that occurs in the first transistor T1, the second transistor T2, the third transistor T3, the fourth transistor T4, the fifth transistor T5, the eighth transistor T8, the ninth transistor T9, and the tenth transistor T10 may be measured. For example, a defect of the first transistor T1 that is the driving transistor may be detected. It may be possible to readily detect a defect of the pixel PXij in the test mode "A". Accordingly, the pixel PXij and display device 1000 (refer to FIG. 1) with an improved reliability may be provided.

The third test period t13 may be provided after the second test period t12. The third test period t13 may be continuous to the second test period t12.

In the third test period t13, the compensation scan signal GCi may be at the active level. The active level of the compensation scan signal GCi may be the low level.

In the third test period t13, the scan signal GWi, the initialization scan signal GIi, the first emission signal EMIi, the second emission signal EM2*i*, and the initialization signal EBi may be at the inactive level. The inactive level of each of the scan signal GWi, the initialization scan signal GIi, the first emission signal EMIi, the second emission signal EM2*i*, and the initialization signal EBi may be the high level.

Figure 7:
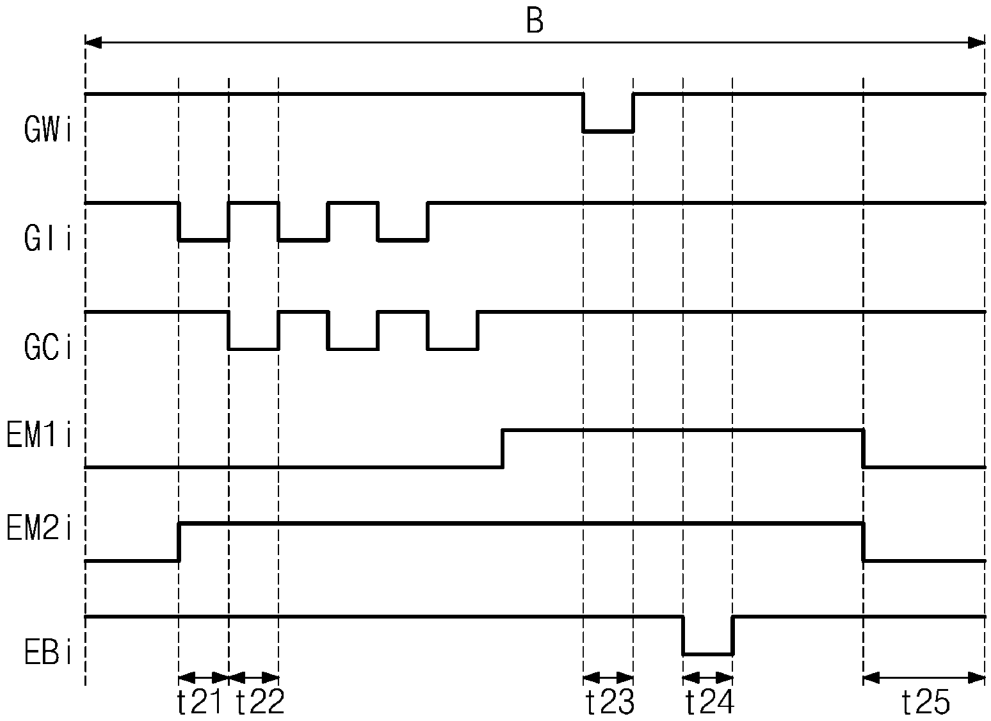
FIG. 7 is a schematic timing diagram of a driving mode of a display device according to an embodiment of the disclosure.

FIG. 7 is a schematic timing diagram of a driving mode of a display device according to an embodiment of the disclosure, and FIGS. 8A to 8E are schematic diagrams for describing an operation of a pixel in a driving mode according to an embodiment of the disclosure. In describing FIGS. 8A to 8E, the components that are described with reference to FIG. 4 are marked by the same reference numerals, and thus, additional description will be omitted to avoid redundancy.

Figure 8A:
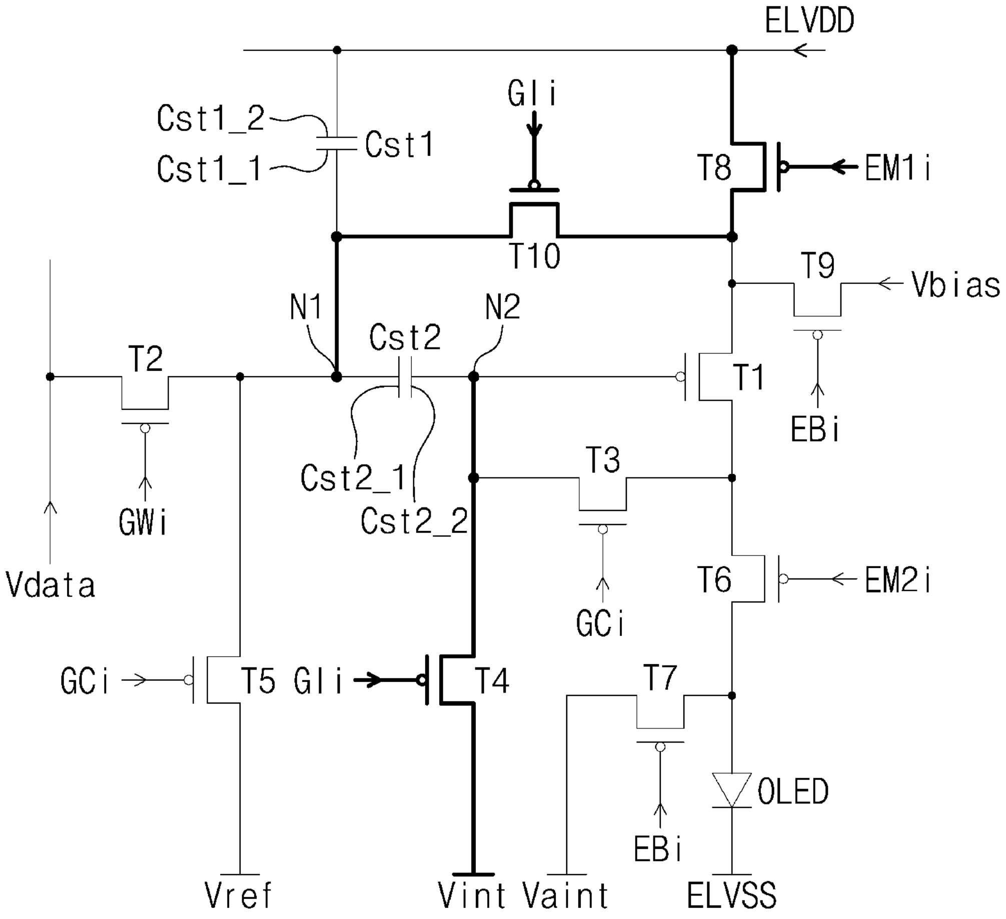
FIGS. 8A to 8E are schematic diagrams for describing an operation of a pixel in a driving mode according to an embodiment of the disclosure.

Referring to FIGS. 4, 7, and 8A, a driving period "B" may include a first driving period t21, a second driving period t22, a third driving period t23, a fourth driving period t24, and a fifth driving period t25. However, this is only an example, and a signal(s) that is set to (to transitions to) the active level in each of the first to fifth driving periods t21 to t25 according to an embodiment of the disclosure is not limited thereto. For example, a signal capable of providing a characteristic in each driving period may be provided in various ways.

FIG. 8A is a schematic diagram for describing an operation of the pixel PXij in the first driving period t21.

In the first driving period t21, the initialization scan signal GIi and the first emission signal EMIi may be at the active level. The active level of the initialization scan signal GIi and the first emission signal EMIi may be the low level.

In the first driving period t21, the scan signal GWi, the compensation scan signal GCi, the second emission signal EM2*i*, and the initialization signal EBi may be at the inactive level. The inactive level of each of the scan signal GWi, the compensation scan signal GCi, the second emission signal EM2*i*, and the initialization signal EBi may be the high level.

The fourth transistor T4 and the tenth transistor T10 may be turned on in response to the initialization scan signal GIi. The first initialization voltage Vint may be provided to the gate G1 of the first transistor T1 through the fourth transistor T4. The first initialization voltage Vint may be provided to the second node N2. The first driving period t21 may be referred to as an "initialization period" in which the gate G1 of the first transistor T1 is initialized.

Figure 8B:
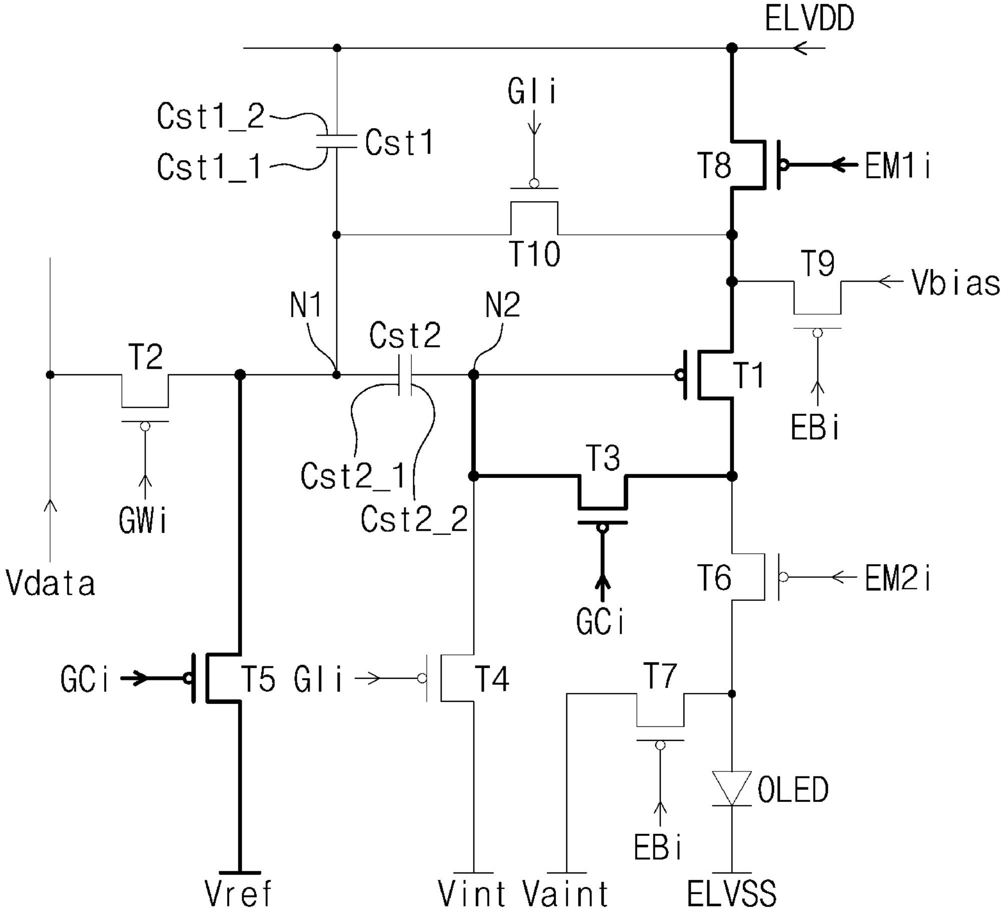

FIG. 8B is a schematic diagram for describing an operation of the pixel PXij in the second driving period t22.

Referring to FIGS. 4, 7, and 8B, in the second driving period t22, the compensation scan signal GCi and the first emission signal EMIi may be at the active level. The active level of each of the compensation scan signal GCi and the first emission signal EMIi may be the low level.

In the second driving period t22, the scan signal GWi, the initialization scan signal GIi, the second emission signal EM2*i*, and the initialization signal EBi may be at the inactive level. The inactive level of each of the scan signal GWi, the initialization scan signal GIi, the second emission signal EM2*i*, and the initialization signal EBi may be the high level.

The third transistor T3 and the fifth transistor T5 may be turned on in response to the compensation scan signal GCi. The eighth transistor T8 may be turned on in response to the first emission signal EMIi.

The first transistor T1 may be electrically connected with the third transistor T3, and the first transistor T1 may be diode-connected by the third transistor T3 thus turned on and may be forward-biased. A compensation voltage "ELVDD-Vth" (or "ELVDD-|Vth|") that is obtained by subtracting a threshold voltage Vth of the first transistor T1 from the first driving voltage ELVDD supplied to the driving voltage line PL may be applied to the gate G1 of the first transistor T1. For example, a voltage of the second node N2 may be the driving voltage "ELVDD-Vth".

The reference voltage Vref may be provided to the drain D2 of the second transistor T2 through the fifth transistor T5.

A voltage of the first node N1 electrically connected with the drain D2 of the second transistor T2 may be the reference voltage Vref.

In the second driving period t22, the first node N1 may be electrically isolated from the driving voltage line PL.

Unlike the disclosure, in a structure where the compensation scan signal GCi is applied to the gate G10 of the tenth transistor T10, an IR drop phenomenon may occur at the first node N1 due to the first driving voltage ELVDD. In this structure, a display quality may be decreased due to the IR drop. However, according to the disclosure, the second driving period t22 in which the compensation scan signal GCi is provided may be provided after the first driving period t21 in which the initialization scan signal GIi is provided. In the first driving period t21, the tenth transistor T10 may be turned on. The phenomenon that a given voltage is provided to the first node N1 may occur in the first driving period t21. The given voltage may be based on the first driving voltage ELVDD. Herein, the phenomenon may be referred to as an "IR drop". In the second driving period t22, the fifth transistor T5 may be turned on. In the second driving period t22, the reference voltage Vref may be provided to the first node N1. The IR drop phenomenon of the first node N1 may be removed by the reference voltage Vref in the second driving period t22. Accordingly, the pixel PXij and the display device 1000 (refer to FIG. 1) with an improved display quality may be provided.

According to the disclosure, in one frame, the first driving period t21 and the second driving period t22 may be repeated several times. The initialization scan signal GIi and the compensation scan signal GCi may be turned on and off repeatedly several times. The influence of previously input data may be further reduced by repeatedly performing the operations of initializing a voltage of the gate G1 of the first transistor T1 and applying the compensation voltage "ELVDD-Vth". Accordingly, the pixel PXij and the display device 1000 (refer to FIG. 1) with an improved display quality may be provided.

The second driving period t22 may be referred to as a "compensation period".

Figure 8C:
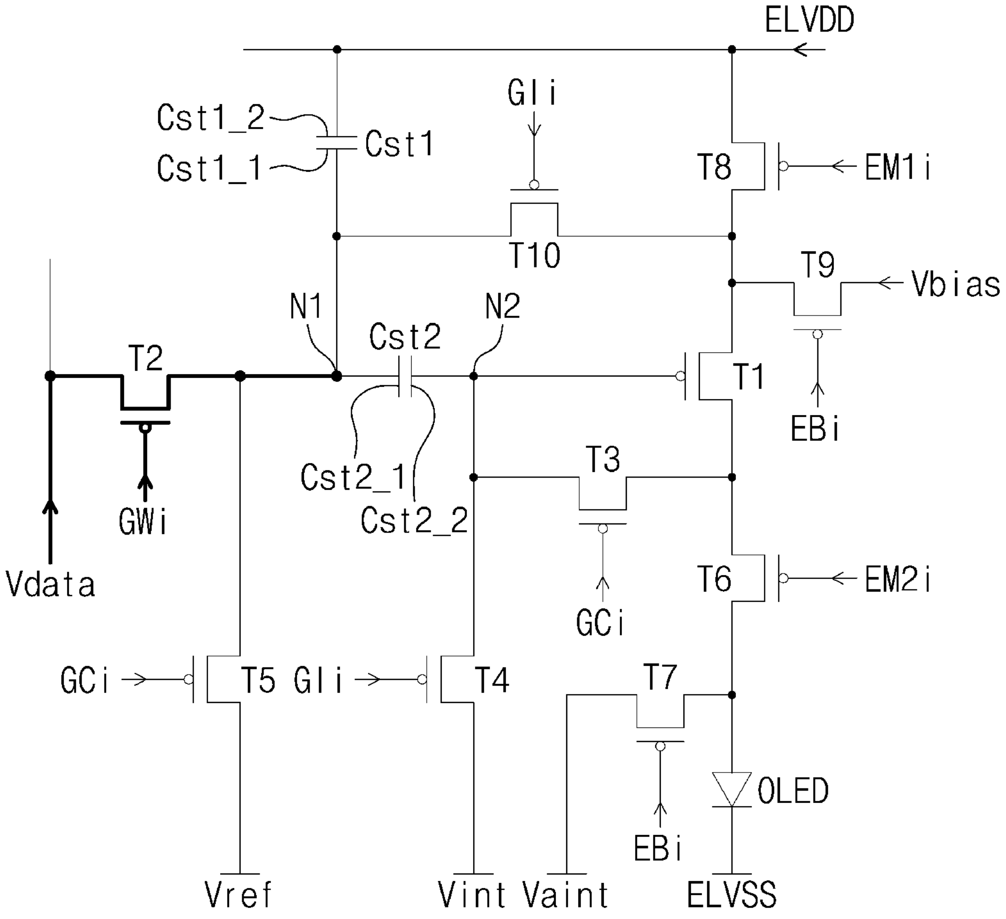

FIG. 8C is a schematic diagram for describing an operation of the pixel PXij in the third driving period t23.

Referring to FIGS. 4, 7, and 8C, in the third driving period t23, the scan signal GWi may be at the active level. The active level of the scan signal GWi may be the low level.

In the third driving period t23, the initialization scan signal GIi, the compensation scan signal GCi, the first emission signal EMIi, the second emission signal EM2*i*, and the initialization signal EBi may be at the inactive level. The inactive level of each of the initialization scan signal GIi, the compensation scan signal GCi, the first emission signal EMIi, the second emission signal EM2*i*, and the initialization signal EBi may be the high level.

The second transistor T2 may be turned on in response to the scan signal GWi.

The data voltage Vdata corresponding to data may be provided to the drain D5 of the fifth transistor T5 through the second transistor T2. Accordingly, a voltage of the first node N1 electrically connected with the drain D5 of the fifth transistor T5 may be the data voltage Vdata. The third driving period t23 may be referred to as a "write period".

The first driving voltage ELVDD and the data voltage Vdata may be respectively applied to opposite ends of the first capacitor Cst1. Charges corresponding to a voltage difference "ELVDD-Vdata" of the opposite ends may be stored in the first capacitor Cst1.

The data voltage Vdata and the compensation voltage "ELVDD-Vth" may be respectively applied to opposite ends of the second capacitor Cst2. Charges corresponding to a voltage difference "ELVDD-Vth-Vdata" of the opposite ends may be stored in the second capacitor Cst2.

A voltage of the first node N1 may be changed from the reference voltage Vref that is a voltage when the fifth transistor T5 is turned on, to the data voltage Vdata that is a voltage when the second transistor T2 is turned on. The voltage difference "Vdata-Vref" of the first node N1 may be transferred to the second node N2 by the coupling of the second capacitor Cst2. For example, a voltage of the second node N2 may be "Vdata+ELVDD−Vth−Vref" that is obtained by adding the compensation voltage "ELVDD−Vth" that is a voltage when the third transistor T3 is turned on and the voltage variation "Vdata−Vref" of the first node N1 when the second transistor T2 is turned on.

Figure 8D:
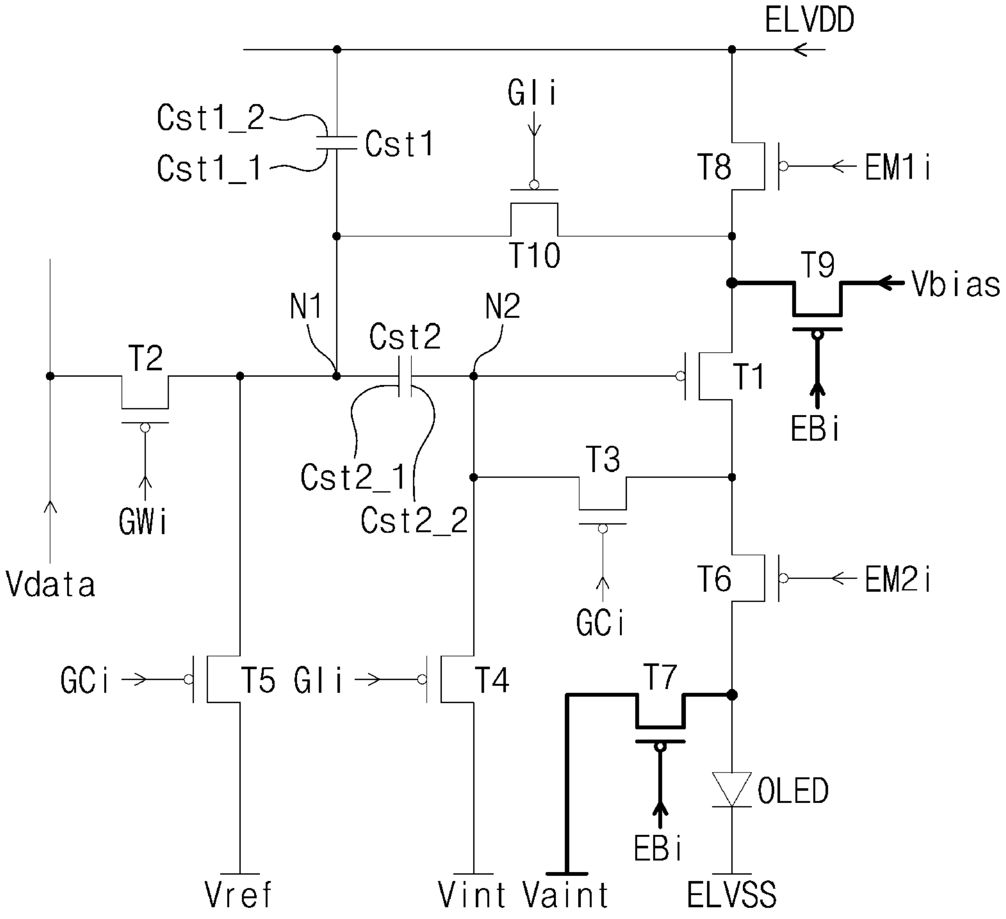

FIG. 8D is a schematic diagram for describing an operation of the pixel PXij in the fourth driving period t24.

Referring to FIGS. 4, 7, and 8D, in the fourth driving period t24, the initialization signal EBi may be at the active level. The active level of the initialization signal EBi may be the low level.

In the fourth driving period t24, the scan signal GWi, the initialization scan signal GIi, the compensation scan signal GCi, the first emission signal EMIi, and the second emission signal EM2*i* may be at the inactive level. The inactive level of each of the scan signal GWi, the initialization scan signal GIi, the compensation scan signal GCi, the first emission signal EMIi, and the second emission signal EM2*i* may be the high level.

The seventh transistor T7 and the ninth transistor T9 may be turned on in response to the initialization signal EBi.

The second initialization voltage Vaint may be provided to the light emitting diode OLED through the seventh transistor T7. As the second initialization voltage Vaint is applied to the first electrode of the light emitting diode OLED, the light emitting diode OLED may be prevented from emitting a light with high luminance instantly due to a residual voltage present at the first electrode of the light emitting diode OLED in the beginning of driving the light emitting diode OLED.

A level of the first initialization voltage Vint may be higher than a level of the second initialization voltage Vaint. However, this is only an example, and the voltage levels of the first initialization voltage Vint and the second initialization voltage Vaint are not limited thereto. For example, the first initialization voltage Vint and the second initialization voltage Vaint may have the same voltage level.

According to the disclosure, the second initialization voltage Vaint different from the first initialization voltage Vint may be provided to the seventh transistor T7. A voltage level of the second initialization voltage Vaint may be lower than a voltage level of the first initialization voltage Vint. For example, a separate optimized initialization voltage for removing a residual voltage may be provided to the light emitting diode OLED. The blemish (or mura) may be prevented from being visually perceived in the active area 1000A (refer to FIG. 1) due to an initialization voltage provided to the light emitting diode OLED at a low gradation. Accordingly, the pixel PXij and the display device 1000 (refer to FIG. 1) with an improved display quality may be provided.

The ninth transistor T9 may provide the bias voltage Vbias to the source S1 of the first transistor T1.

Unlike the disclosure, depending on a hysteresis characteristic of the first transistor T1, the driving current of the first transistor T1 by the data voltage Vdata applied in a current frame may be affected by the data voltage Vdata applied in a previous frame. In detail, even though the data voltage Vdata for displaying an image of a specific gradation are applied in a frame, in the case where the data voltage Vdata for displaying an image of the specific gradation are applied in a previous frame, an image whose gradation is higher than the specific gradation may be displayed in the display layer 100. Also, even though the data voltage Vdata for displaying an image of a specific gradation are applied in a frame, in the case where the data voltage Vdata for displaying a high-gradation image are applied in a previous frame, an image whose gradation is lower than the specific gradation may be displayed in the display layer 100 (refer to FIG. 1). As such, in case that the image IM (refer to FIG. 1) is displayed in the display layer 100 (refer to FIG. 2), an image quality may be reduced due to a phenomenon such as a flicker. The reduction of the image quality may become worse because a time during which the data voltage Vdata of a previous frame are applied to the first transistor T1 when the display layer 100 (refer to FIG. 2) is driven at a low frequency is longer than the time the display layer 100 (refer to FIG. 2) is driven at a high frequency. However, according to the disclosure, as the bias voltage Vbias is applied to the source S1 of the first transistor T1 through the ninth transistor T9, the luminance deviation due to a hysteresis characteristic of the first transistor T1 may decrease. Accordingly, the electronic device 1000 (refer to FIG. 1) that can prevent the reduction of a display quality for each operating frequency may be provided.

The fourth driving period t24 may be referred to as a "black initialization period".

Figure 8E:
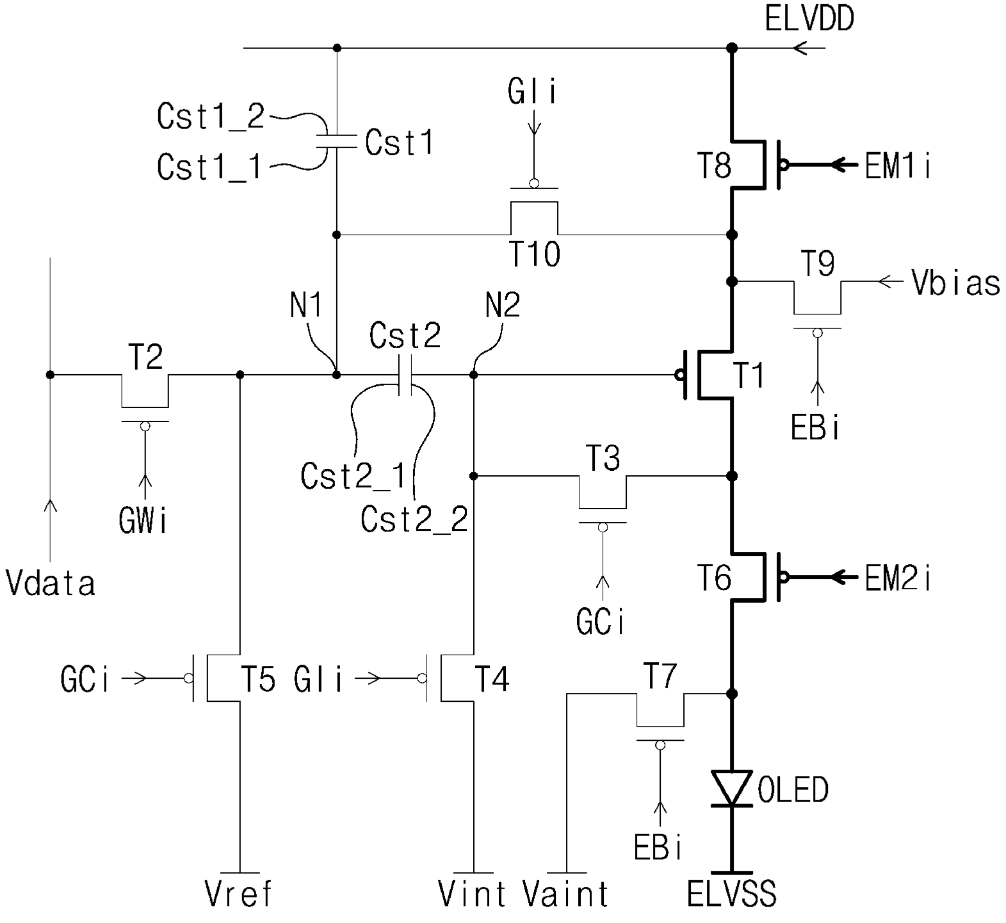

FIG. 8E is a schematic diagram for describing an operation of the pixel PXij in the fifth driving period t25.

Referring to FIGS. 4, 7, and 8E, in the fifth driving period t25, the first emission signal EMli and the second emission signal EM2*i* may be at the active level. The active level of each of the first emission signal EMli and the second emission signal EM2*i* may be the low level.

In the fifth driving period t25, the scan signal GWi, the initialization scan signal GIi, the compensation scan signal GCi, and the initialization signal EBi may be at the inactive level. The inactive level of each of the scan signal GWi, the initialization scan signal GIi, the compensation scan signal GCi, and the initialization signal EBi may be the high level.

The eighth transistor T8 may be turned on in response to the first emission signal EMli. The sixth transistor T6 may be turned on in response to the second emission signal EM2*i*.

A driving current may flow depending on a difference between a gate voltage of the gate G1 of the first transistor T1 and a source voltage of the source S1 of the first transistor T1. As the first driving voltage ELVDD is supplied to the light emitting diode OLED through the sixth transistor T6 and the eighth transistor T8, a current may flow to (or through) the light emitting diode OLED. The gate-source voltage of the first transistor T1 may be maintained at "(Vdata+ELVDD−Vth−Vref)−ELVDD" by the second capacitor Cst2. According to the current-voltage relationship of the first transistor T1, the driving current of the first transistor T1 may be proportional to the square of a value obtained by subtracting the threshold voltage Vth of the first transistor T1 from the gate-source voltage of the first transistor T1, for example, (Vdata−Vref) 2. As such, the driving current may be determined regardless of the threshold voltage Vth of the first transistor T1.

As a data voltage from the data driving circuit DDC (refer to FIG. 3) is written in the pixel PXij, the light emitting diode OLED may emit a light.

The fifth driving period t25 may be referred to as an "emission period".

According to the above description, in a test mode, a current path may be formed in a pixel through a first transistor to a sixth transistor. Test information may be measured from a first initialization voltage line based on a test voltage provided through a data line. The user may test a state of the pixel based on the test information. A pixel and a display device capable of improving a detectable coverage (or testable range) of transistors may be provided. Accordingly, the pixel and the display device capable of improving reliability may be provided.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A pixel comprising:

a first capacitor electrically connected between a first node and a second node;

a second capacitor electrically connected between a first driving voltage line providing a first driving voltage and the first node;

a light emitting diode including a first electrode and a second electrode, the second electrode electrically connected with a second driving voltage line providing a second driving voltage;

a first transistor including a first electrode electrically connected with the first driving voltage line, a second electrode electrically connected with the first electrode of the light emitting diode, and a gate electrically connected with the second node;

a second transistor including a first electrode electrically connected with a data line, a second electrode electrically connected with the first node, and a gate receiving a scan signal;

a third transistor including a first electrode electrically connected with the first node, a second electrode electrically connected with a reference voltage line, and a gate receiving a compensation scan signal;

a fourth transistor including a first electrode directly electrically connected with the first electrode of the first transistor, a second electrode directly electrically connected with the first node, and a gate receiving an initialization scan signal;

a fifth transistor including a first electrode electrically connected with the second electrode of the first transistor, a second electrode electrically connected with the second node, and a gate receiving the compensation scan signal; and a sixth transistor including a first electrode electrically connected with the second node, a second electrode electrically connected with a first initialization voltage line, and a gate receiving the initialization scan signal.

2. The pixel of claim 1, further comprising:
a seventh transistor including a first electrode electrically connected with the first driving voltage line, a second electrode electrically connected with the first electrode of the first transistor, and a gate receiving a first emission signal; and
an eighth transistor including a first electrode electrically connected with the first electrode of the light emitting diode, a second electrode electrically connected with the second electrode of the first transistor, and a gate receiving a second emission signal.

3. The pixel of claim 2, further comprising:
a ninth transistor including a first electrode electrically connected with the first electrode of the first transistor, a second electrode electrically connected with a bias voltage line providing a bias voltage, and a gate receiving an initialization signal; and
a tenth transistor including a first electrode electrically connected with a second initialization voltage line, a second electrode electrically connected with the first electrode of the light emitting diode, and a gate receiving the initialization signal.

4. The pixel of claim 1, wherein, during a first period, the initialization scan signal is at an active level.

5. The pixel of claim 4, wherein, during a second period continuous to the first period,
the scan signal, the initialization scan signal, and the compensation scan signal are at the active level, and
a test voltage is applied to the data line.

6. The pixel of claim 5, wherein, during the second period,
a level of the test voltage is identical to a level of a reference voltage provided to the reference voltage line, and
the data line and the first initialization voltage line are electrically connected.

7. The pixel of claim 5, wherein a saturation current is provided to the data line in the second period.

8. The pixel of claim 5, wherein, during a third period continuous to the second period, the compensation scan signal is at the active level.

9. A display device comprising:
a display layer including a plurality of pixels, and operating in a test mode or a driving mode different from the test mode,
wherein each of the plurality of pixels includes:
a first capacitor electrically connected between a first node and a second node;
a second capacitor electrically connected between a first driving voltage line providing a first driving voltage and the first node;
a light emitting diode including a first electrode and a second electrode, the second electrode electrically connected with a second driving voltage line providing a second driving voltage;
a first transistor including a first electrode electrically connected with the first driving voltage line, a second electrode electrically connected with the first electrode of the light emitting diode, and a gate electrically connected with the second node;
a second transistor including a first electrode electrically connected with a data line, a second electrode electrically connected with the first node, and a gate receiving a scan signal;
a third transistor including a first electrode electrically connected with the first node, a second electrode electrically connected with a reference voltage line, and a gate receiving a compensation scan signal; and
a fourth transistor including a first electrode directly electrically connected with the first electrode of the first transistor, a second electrode directly electrically connected with the first node, and a gate receiving an initialization scan signal;
a fifth transistor including a first electrode electrically connected with the second electrode of the first transistor, a second electrode electrically connected with the second node, and a gate receiving the compensation scan signal; and
a sixth transistor including a first electrode electrically connected with the second node, a second electrode electrically connected with a first initialization voltage line, and a gate receiving the initialization scan signal.

10. The display device of claim 9, wherein each of the plurality of pixels further includes:
a seventh transistor including a first electrode electrically connected with the first driving voltage line, a second electrode electrically connected with the first electrode of the first transistor, and a gate receiving a first emission signal;
an eighth transistor including a first electrode electrically connected with the first electrode of the light emitting diode, a second electrode electrically connected with the second electrode of the first transistor, and a gate receiving a second emission signal;
a ninth transistor including a first electrode electrically connected with the first electrode of the first transistor, a second electrode electrically connected with a bias voltage line providing a bias voltage, and a gate receiving an initialization signal; and
a tenth transistor including a first electrode electrically connected with a second initialization voltage line, a second electrode electrically connected with the first electrode of the light emitting diode, and a gate receiving the initialization signal.

11. The display device of claim 10, wherein
the test mode includes a first test period, a second test period, and a third test period, and
during the first test period, the initialization scan signal is at an active level.

12. The display device of claim 11, wherein, during the second test period,
the scan signal, the initialization scan signal, and the compensation scan signal are at the active level, and
a test voltage is applied to the data line.

13. The display device of claim 12, wherein, during the second test period,
a level of the test voltage is identical to a level of a reference voltage provided to the reference voltage line, and
the data line and the first initialization voltage line are electrically connected.

14. The display device of claim 12, wherein a saturation current is provided to the data line in the second test period.

15. The display device of claim 12, wherein, during the third test period, the compensation scan signal is at the active level.

16. The display device of claim 11, wherein
the driving mode includes a first driving period to a fifth driving period,
during the first driving period, the first emission signal and the initialization scan signal are at the active level,
during the second driving period, the first emission signal and the compensation scan signal are at the active level, and during the second driving period, the first node is electrically isolated from the first driving voltage line.

17. The display device of claim 16, wherein, during the third driving period, the scan signal is at the active level.

18. The display device of claim 16, wherein, during the fourth driving period, the initialization signal is at the active level.

19. The display device of claim 16, wherein, during the fifth driving period, the first emission signal and the second emission signal are at the active level.

20. An electronic device comprising:

a display device comprising:

a display layer including a plurality of pixels, and operating in a test mode or a driving mode different from the test mode, wherein each of the plurality of pixels includes:

a first capacitor electrically connected between a first node and a second node;

a second capacitor electrically connected between a first driving voltage line providing a first driving voltage and the first node;

a light emitting diode including a first electrode and a second electrode, the second electrode electrically connected with a second driving voltage line providing a second driving voltage;

a first transistor including a first electrode electrically connected with the first driving voltage line, a second electrode electrically connected with the first electrode of the light emitting diode, and a gate electrically connected with the second node;

a second transistor including a first electrode electrically connected with a data line, a second electrode electrically connected with the first node, and a gate receiving a scan signal;

a third transistor including a first electrode electrically connected with the first node, a second electrode electrically connected with a reference voltage line, and a gate receiving a compensation scan signal;

a fourth transistor including a first electrode directly electrically connected with the first electrode of the first transistor, a second electrode directly electrically connected with the first node, and a gate receiving an initialization scan signal;

a fifth transistor including a first electrode electrically connected with the second electrode of the first transistor, a second electrode electrically connected with the second node, and a gate receiving the compensation scan signal; and a sixth transistor including a first electrode electrically connected with the second node, a second electrode electrically connected with a first initialization voltage line, and a gate receiving the initialization scan signal.

* * * * *